United States Patent [19]
Inoue

[11] Patent Number: 5,933,362
[45] Date of Patent: Aug. 3, 1999

[54] METHOD OF ADDING TWO BINARY NUMBERS AND BINARY ADDER USED THEREIN

[75] Inventor: Toshiaki Inoue, Tokyo, Japan

[73] Assignee: NEC Corporation, Tokyo, Japan

[21] Appl. No.: 08/797,121

[22] Filed: Feb. 10, 1997

[30] Foreign Application Priority Data

Feb. 14, 1996 [JP] Japan .................................. 8-050900

[51] Int. Cl.⁶ .............................. G06F 7/50; G06F 7/38
[52] U.S. Cl. ...................... 364/787.02; 364/749
[58] Field of Search ........................ 364/787.02, 749

[56] References Cited

U.S. PATENT DOCUMENTS

| | | | |
|---|---|---|---|
| 4,707,800 | 11/1987 | Montrone et al. | 364/749 |
| 4,768,160 | 8/1988 | Yokoyama | 364/749 |
| 5,081,607 | 1/1992 | Bates et al. | 364/749 |
| 5,189,636 | 2/1993 | Patti et al. | 364/749 |
| 5,327,369 | 7/1994 | Ashkenazi | 364/749 |
| 5,390,135 | 2/1995 | Lee et al. | 364/749 |
| 5,719,802 | 2/1998 | Purcell et al. | 364/749 |

OTHER PUBLICATIONS

Chamas et al., "TP 10.5: A 64b Microprocessor with Multimedia Support", IEEE International Solid–State Circuits Conference, pp. 178–179, 1995.

Kohn et al., "The Visual Instruction Set (VIS) in UltraSPARC™", IEEE, pp. 462–463 and 466–467, 1995.

*Primary Examiner*—Tan V. Mai
*Attorney, Agent, or Firm*—Foley & Lardner

[57] ABSTRACT

An adder has a carry signal generation block for producing carry generation signal bits representative of carry bits resulted from augend signal bits and addend signal bits and carry propagation signal bits representative of carry bits resulted from the augend signal bits, the addend signal bits and the carry bits supplied from lower-digits, a carry propagation block responsive to control signal bits for dividing the adder into partial adders and having propagation stages for producing carry signal bits from the carry generation signal bits, the carry propagation signal bits and the control signal bits, and a sum generation block for producing sum signal bits from the carry propagation signal bits, the control signal bits and the carry signal bits, and is divisible into an arbitrary number of partial adders without increase the stages of a critical path.

9 Claims, 7 Drawing Sheets

METHOD OF ADDING TWO BINARY NUMBERS AND BINARY ADDER USED THEREIN

FIELD OF THE INVENTION

This invention relates to an arithmetic operation and, more particularly, to a method of adding two binary numbers and a binary adder used therein.

DESCRIPTION OF THE RELATED ART

An adder is an indispensable arithmetic component of a microprocessor, and is usually implemented by adders arranged in parallel for respectively calculating partial sums. In the following description, the adder for calculating a partial sum is referred to as "partial adder", and the adder for calculating the total sum is called as "composite adder". If the carry bits are sequentially supplied from the partial adders to the partial adders next thereto, the partial adders serve as a high-precision composite adder. On the other hand, if the partial adders independently output the partial sums, the partial adders serve low-precision parallel adders. For example, four 16-bit partial adders are assumed to be arranged in parallel. The four 16-bit partial adders serve as a 64-bit composite adder or four parallel adders depending upon whether the carry bits are transferred from the carry output nodes of the partial adders to the carry input node of the next partial adders or not. Thus, the carry controlling technology changes partial adders between a high-precision composite adder and low-precision parallel adders. The carry controlling technology is disclosed by A. Chamas et. al. in "A 64b Microprocessor with Multimedia Support", IEEE International Solid-State Circuit Conference Digest of Technical Papers, February 1995, pages 178 to 179. In the paper, the carry controlling technology is applied to 32-bit partial adders.

FIG. 1 illustrates four 16-bit partial adders $1a$, $1b$, $1c$ and $1d$ arranged in parallel, and selectors $2a$, $2b$ and $2c$ are connected between the four partial adders $1a$ to $1d$. A 64-bit augend A63-A0 are divided into four segments A63-A48, A47-A32, A31-A16 and A15-A0, and the four segments A63-A48, A47-A32, A31-A16, A15-A0 are supplied to the four partial adders $1a$ to $1d$, respectively. Similarly, a 64-bit addend B63-B0 is divided into four segments B63-B48, B47-B32, B31-B16 and B15-B0, the segments B63-B48, B47-B32, B31-B16, B15-B0 are respectively supplied to the four partial adders $1a$ to $1d$. The four 16-bit partial adders $1a$ to $1d$ add the segments B63-B48, B47-B32, B31-B16, B15-B0 to the segments A63-A48, A47-A32, A31-A16, A15-A0, respectively, and produce partial sums S63-S48, S47-S32, S31-S16, S15-S0 and carry bits C47, C31 and C15. The 16-bit partial adders $1b$ to $1d$ supply the carry bits C47, C31, C15 to the selectors $2a$, $2b$ and $2c$, and the selectors $2a$ to $2c$ transfer one of the carry bits C47, C31, C15 or bit "0" depending upon a carry control signal (not shown).

When the selectors $2a$ to $2c$ transfer the carry bits C47, C31, C15, the four 16-bit partial adders $1a$ to $1d$ serve as a high-precision composite adder for generating a 64-bit total sum S63-S0. On the other hand, if the selectors $2a$ to $2c$ interrupt the carry bits C47, C31, C15 and supply bit "0" to the 16-bit partial adders $1a$ to $1c$, the four 16-bit partial adders $1a$ to $1d$ assume the segments A63-A48, A47-A32, A31-A16, A15-A0 and the segments B63-B48, B47-B32, B31-B16, B15-B0 to be augends and addends, and output four 16-bit total sums S63-S48, S47-S32, S31-S16, S15-S0, respectively.

Assuming now that high-speed binary carry-lookahead adders are used as the partial adders $1a$ to $1d$, the carry signal is propagated through the composite adder as follows. If the composite adder is implemented by eight 8-bit partial adders, the carry signal is expected to pass 24 stages calculated as $8 \log_2 8$. If the composite adder is implemented by four 16-bit partial adders, the carry signal is expected to pass 16 stages calculated as $4 \log_2 16$. If two 32-bit partial adders form the composite adder, the gate stages are calculated as $2 \log_2 32=10$. In summary, if k-bit partial adders form in combination an n-bit composite adder, a carry bit is expected to pass through gate stages calculated as $(n/k) \log_2 k$, and two more stages are required for the generation of carry signal and the generation of total sum. Thus, the gate stages of the critical path for the carry propagation is increased together with the bit ratio (n/k) as indicated by plots PL1 in FIG. 2.

The prior art composite adder encounters a problem in that the delay due to the carry propagation is varied by the precision of the partial adders or the number of bits calculated by each partial adder.

Even if binary carry-lookahead adders are used for low-precision addition through a highly parallel arrangement, the binary carry-lookahead adders can not speed up the composite adder, and the composite adder suffers from long time delay.

SUMMARY OF THE INVENTION

It is therefore an important object of the present invention to provide a method of addition which produces a total sum at a constant speed regardless of the precision of partial adders.

It is also an important object of the present invention to provide an adder which produces a total sum through the method.

In accordance with one aspect of the present invention, there is provided a method of adding an n-bit binary addend signal having an addend signal bit ADDi ($0 \leq i \leq n-1$) to an n-bit binary augend signal having a augend signal bit AGDi corresponding to the addend signal bit ADDi where n is equal to or grater than 2, comprising the steps of: a) producing a carry generation signal having a carry generation signal bit Gi ($0 \leq i \leq n-1$) representative of a carry bit resulted from an addition between the addend signal bit ADDi and the augend signal bit AGDi and a carry propagation signal having a carry propagation signal bit Pi ($0 \leq i \leq n-1$) representative of a carry bit resulted from a addition between the addend signal bit ADDi, the augend signal bit AGDi and a carry bit supplied from an (i-1) digit; b) producing a carry signal representative of carry bits from the carry propagation signal, the carry generation signal and an n-bit control signal having a control signal bit Ti ($0 \leq i \leq n-1$), the carry signal having a carry signal bit Ci ($0 \leq i \leq n-1$) produced through logical expression (1)

$$Ci = Gi(m) + Pi(m) \cdot Ti(m) \cdot Ci - 2^m \qquad (1)$$

where Gi(m), Pi(m) and Ti(m) are a secondary carry generation signal bit, a secondary carry propagation bit and a secondary control signal bit at digit-i produced from the carry generation signal bit Gi, the carry propagation signal bit Pi and the control signal bit Ci and expressed as, $$Gi(m) = Gi(m-1) + Pi(m-1) \cdot Ti(m-1) \cdot Gi - 2^m(m-1)$$

$$Pi(m) = Pi(m-1) \cdot Pi - 2^m(m-1)$$

$$Ti(m)=Ti(m-1)\cdot Ti\text{-}2^m(m-1)$$

$$0\leq m\leq \log_2 n-1,\ Gi(-1)=Gi,\ Pi(-1)=Pi,\ Ti(-1)=Ti,$$

logical expression (2) is satisfied by a combination of i and m which fulfill inequality of $i<2^m$ $$Gi\text{-}2^m(m-1)=Pi\text{-}2^m(m-1)=Ti\text{-}2^m(m-1)=0 \quad (2);$$

and c) producing a sum signal representative of a sum of the n-bit binary augend signal and the n-bit binary addend signal, the sum signal having a sum signal bit Si ($0\leq i\leq n-1$) produced through logical expression (3)

$$Si=Pi\ \hat{}\ (Ti\cdot Ci\text{-}1) \quad (3).$$

In accordance with another aspect of the present invention, there is provided an adder for adding an n-bit binary addend signal having an addend signal bit ADDi to an n-bit binary augend signal having an augend signal bit AGDi corresponding to the addend signal bit ADDi, comprising: a carry signal generation block for producing a carry generation signal having a carry generation signal bit Gi ($0\leq i\leq n-1$) representative of a carry bit resulted from an addition between the addend signal bit ADDi and the augend signal bit AGDi and a carry propagation signal having a carry propagation signal bit Pi ($0\leq i\leq n-1$) representative of a carry bit resulted from a addition between sad addend signal bit ADDi, the augend signal bit AGDi and a carry bit supplied from an (i−1) digit; a carry propagation block for producing a carry signal representative of carry bits from the carry propagation signal, the carry generation signal and an n-bit control signal having a control signal bit Ti ($0\leq i\leq n-1$), the carry signal having a carry signal bit Ci ($0\leq i\leq n-1$) produced through logical expression (1)

$$Ci=Gi(m)+Pi(m)\cdot Ti(m)\cdot Ci\text{-}2^m \quad (1)$$

where Gi(m), Pi(m) and Ti(m) are a secondary carry generation signal bit, a secondary carry propagation bit and a secondary control signal bit at digit-i produced from the carry generation signal bit Gi, the carry propagation signal bit Pi and the control signal bit Ci and expressed as, $$Gi(m)=Gi(m-1)+Pi(m-1)\cdot Ti(m-1)\cdot Gi\text{-}2^m(m-1)$$

$$Pi(m)=Pi(m-1)\cdot Pi\text{-}2^m(m-1)$$

$$Ti(m)=Ti(m-1)\cdot Ti\text{-}2^m(m-1)$$

$$0\leq m\leq \log_2 n-1,\ Gi(-1)=Gi,\ Pi(-1)=Pi,\ Ti(-1)=Ti,$$

logical expression (2) is satisfied by a combination of i and m which fulfill inequality of $i<2^m$ $$Gi\text{-}2^m(m-1)=Pi\text{-}2^m(m-1)=Ti\text{-}2^m(m-1)=0 \quad (2);$$

and a sum generation block for producing a sum signal representative of a sum of the n-bit binary augend signal and the n-bit binary addend signal, the sum signal having a sum signal bit Si ($0\leq i\leq n-1$) produced through logical expression (3)

$$Si=Pi\ \hat{}\ (Ti\cdot Ci\text{-}1) \quad (3).$$

BRIEF DESCRIPTION OF THE DRAWINGS

The features and advantages of the method of addition and the binary adder according to the present invention will be more clearly understood from the following description taken in conjunction with the accompanying drawings in which.

DESCRIPTION OF THE PREFERRED EMBODIMENT

Figure 3:
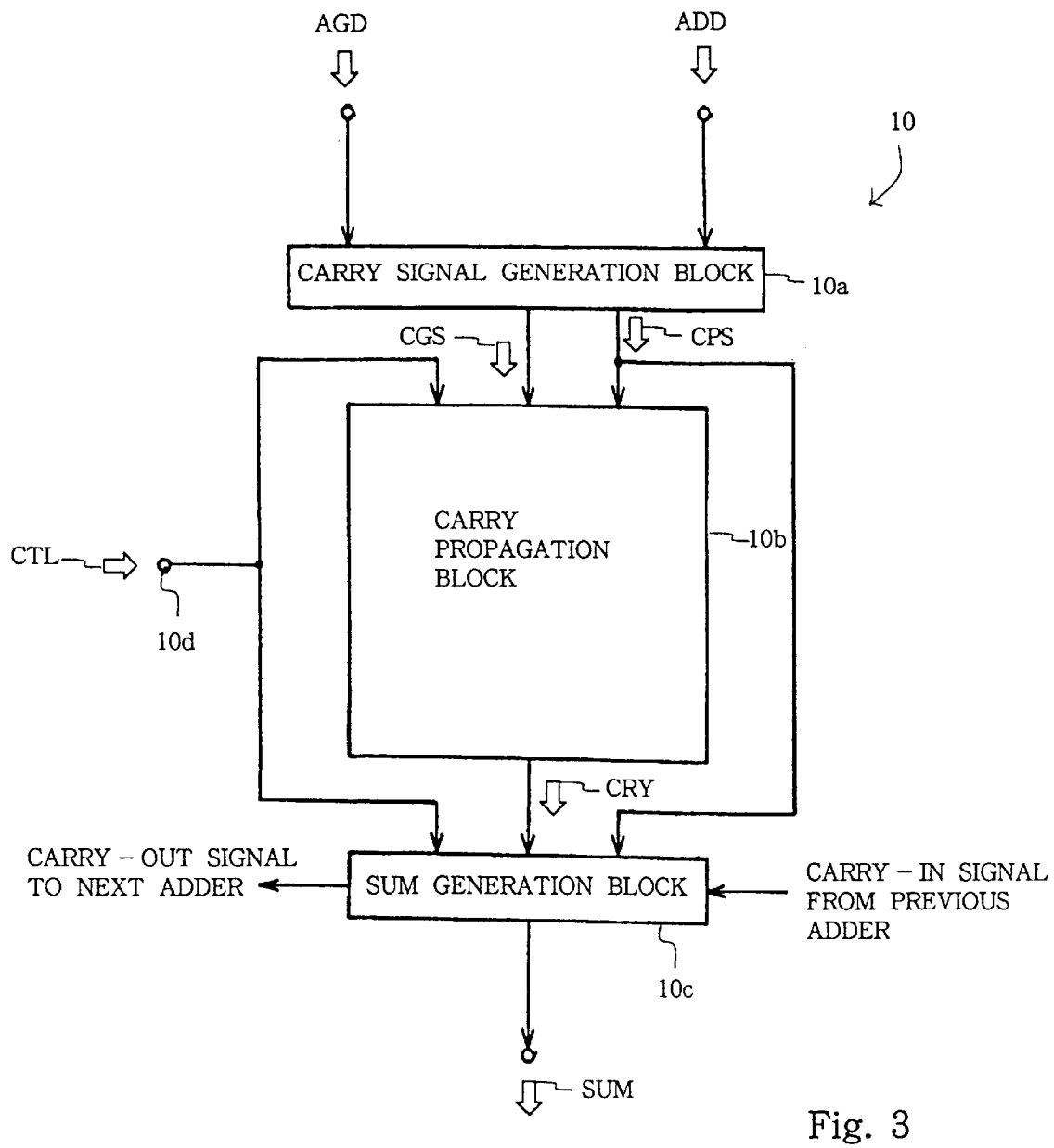
FIG. 3 is a block diagram showing an adder according to the present invention.

Referring to FIG. 3 of the drawings, an adder 10 embodying the present invention comprises a carry signal generation block 10a, a carry propagation block 10b and a sum generation block 10c, and a control signal port 10d is provided for an n-bit control signal CTL. These are detailed hereinbelow.

The carry signal generation block 10a produces a carry generation signal CGS and a carry propagation signal CPS from an n-bit augend signal AGD and an n-bit addend signal ADD. The carry signal generation block 10a examines each bit of the augend signal AGD and the corresponding bit of the addend signal ADD to see whether or not a carry bit takes place, and produces a carry generation signal bit Gi of the carry generation signal CGS. In other words, the carry generation signal bit Gi represents the carry bit of logic "1" level or non-carry bit of logic "0" bit. The carry signal generation block 10a further examines each bit of the augend AGD, the corresponding bit of the addend ADD and the carry/non-carry bit from the digit (i−1) to see whether or not these bits produce a carry bit, and produces a carry propagation signal bit Pi from these bits. If these bits result in a carry bit, the carry signal generation block 10a gives logic "1" level to the carry propagation signal bit Pi. On the other hand, if no carry bit takes place, the carry propagation block 10a keeps the carry propagation signal bit Pi in logic "0" level.

The carry generation signal CGS is supplied from the carry signal generation block 10a to the carry propagation block 10b, and the carry propagation signal CPS is supplied to both of the carry propagation block 10b and the sum generation block 10c.

Not only the carry generation signal CGS and the carry propagation signal CPS but also the n-bit control signal CTL are supplied to the carry propagation block 10b, and the carry propagation block 10b produces an n-bit carry signal CRY, and the carry signal CRY represents carry bits supplied to individual digits. The carry signal CRY is supplied from the carry propagation block 10b to the sum generation block 10c.

As described hereinbefore, each of the carry generation signal CGS, the carry propagation signal CPS, the control signal CTL and the carry signal CRY has n digits, and contains respective bits Gi, Pi, Ti and Ci at i digit where i is not less than zero and not greater than (n−1). The carry propagation block 10b produces the carry bit Ci through logical expression (1).

$$Ci=Gi(m)+Pi(m)\cdot Ti(m)\cdot Ci\text{-}2^m \qquad (1)$$

where $$Gi(m)=Gi(m-1)+Pi(m-1)\cdot Ti(m-1)\cdot Gi\text{-}2^m(m-1)$$

$$Pi(m)=Pi(m-1)\cdot Pi\text{-}2^m(m-1)$$

$$Ti(m)=Ti(m-1)\cdot Ti\text{-}2^m(m-1)$$

wherein $0 \leq m \leq \log_2 n-1$, $G(-1)=Gi$, $Pi(-1)=Pi$, $Ti(-1)=Ti$ and the following logical expression is satisfied by any combination between i and m which fulfills $i<2^m$.

$$Gi\text{-}2^m(m-1)=Pi\text{-}2^m(m-1)=Ti\text{-}2^m(m-1)=0$$

When the control variable Ti is introduced into the logical expression Ci=Gi+Pi Ci−1, we obtain the logical expression (1).

The sum generation block 10c produces an n-bit sum signal SUM from the carry signal CRY, the control signal CTL and the carry propagation signal CPS, and the sum signal has a bit Si at the i-digit expressed as follows.

$$Si=Pi \;\hat{}\; (Ti\cdot Ci\text{-}1) \qquad (2)$$

When the control variable Ti is introduced into the logical expression Si=Pi ^ Ci−1, we obtain the logical expression (2).

If the adder forms a part of a composite adder, a carry-in signal is further supplied to the sum generation block 10c, and supplies a carry-out signal to the next adder as shown in FIG. 3.

The control bit Ti makes the carry bit supplied from the lower digit (i−1) valid or invalid depending upon the logic level in the carry propagation block 10b. As described hereinbefore, the carry propagation block 10b supplies the n-bit carry signal CRY to the sum generation block. If the control bit Ti is in logic "1" level, the propagation of the carry bit C(i−1) is decided to be valid in the carry propagation block 10b, and the sum generation block 10c takes the carry bit C(i−1) into account. On the other hand, if the control bit Ti is in logic "0" level, the propagation of the carry bit C(i−1) is decided to be invalid in the carry propagation block 10b, and the sum generation block 10c ignores the carry bit C(i−1). For this reason, when all the control bits C0 to Cn are changed to logic "1" level, the adder 10 serves as an n-bit full adder. On the other hand, if the user selectively changes the control bits C0 to Cn to logic "0" level, the adder 10 is divided into a plurality of low-precision partial adders, and the partial adders operate in parallel for producing partial sums. For example, if 16-bit control signal CTL has the bit string (1110111011101110), the adder 10 is divided into 4-bit parallel adders.

Figure 4:
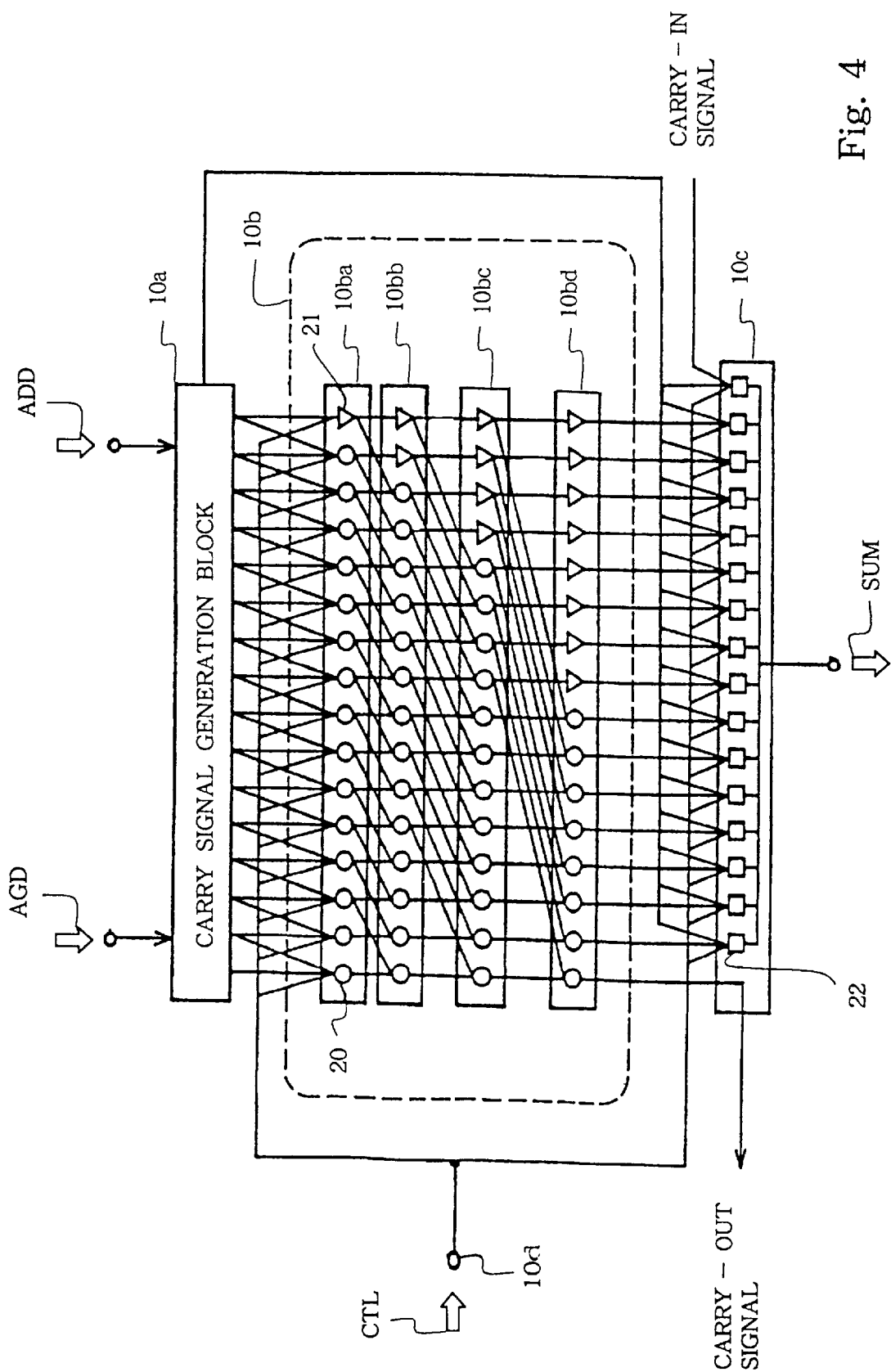
FIG. 4 is a block diagram showing the arrangement of a carry propagation block and the arrangement of a sum generation block incorporated in the adder.

FIG. 4 illustrates the internal signal paths of the carry propagation block 10b and the internal signal paths of the sum generation block 10c, and n is assumed to be 16.

The carry signal generation block 10a produces the carry generation signal CGS and the carry propagation signal CPS from a 16-bit augend AGD and a 16-bit addend ADD, and the augend bit AGDi at i-digit and the addend bit ADDi at i-digit result in the carry generation bit Gi and the carry propagation bit Pi where $0 \leq i \leq 15$. The carry generation signal CGS and the carry propagation signal CPS are supplied to the carry propagation block 10b, and the carry propagation signal CPS is further supplied to the sum generation block 10c.

The carry propagation block 10b has four propagation stages 10ba, 10bb, 10bc and 10bd, because inequality $0 \leq m \leq \log_2 n-1$ gives m=0, 1, 2, 3. The propagation stages 10ba, 10bb, 10bc and 10bd are corresponding to m=0, m=1, m=2 and m=3, respectively. The carry generation bits Gi, the carry propagation bits Pi and the control signal bits Ti are supplied from the carry signal generation block 10a to the first propagation stage 10ba, and supplies the carry generation bits Gi, the carry propagation bits Pi and the control signal bits Ti to the second propagation stage 10bb. Similarly, the second and third propagation stages 10bb and 10bc supply the carry generation bits Gi, the carry propagation bits Pi and the control signal bits Ti to the third and fourth propagation stages 10bc and 10bd, respectively. The final propagation stage 10bd is supplied with the carry generation bits Gi, the carry propagation bits Pi and the control signal bits Ti from the previous propagation stage 10bc, and supplies the carry bits Ci to the sum generation block 10c.

Sixteen components circuits are incorporated in each of the propagation stages 10ba to 10bd, and respectively occupy sixteen digits. Two kinds of component circuit 20 and 21 form the propagation stage 10ba/10bb/10bc/10bd. One of the two kinds of component circuit 20 is represented by a small circle, and occupies each i-digit satisfying the inequality $i \geq 2^m$. The other kind of component circuit 21 is represented by a small triangle, and occupies each i-digit satisfying the inequality $i<2^m$. The component circuit 20 represented by the small circle and the component circuit 21 represented by the small triangle are hereinbelow referred to as "first component circuit" and "second component circuit", respectively.

As to the first propagation stage 10ba, zero-digit is occupied by the second component circuit 21, and the first component circuits 20 are located at the other digits, respectively. On the other hand, 0-digit and 1-digit of the propagation stage 10bb are respectively occupied by the second component circuits 21, and the other digits are occupied by the first component circuits 20, respectively. The third propagation stage has 0-digit to 3-digit assigned to the second component circuits 21 and 4-digit to 15-digit respectively occupied by the first component circuits 20. 0-digit to 7-digit and 8-digit to 15-digit of the final propagation stage are respectively assigned to the second component circuits 21 and the first component circuits 20.

The carry signal generation block 10a/signal port 10d, the first propagation stage, the second propagation stage and the third propagation stage are the previous stages (m−1) of the first to final propagation stages, respectively, and suffix (m−1) means the previous stage. On the other hand, the second propagation stage to the final propagation stage are next propagation stages of the first propagation stage to the third propagation stage, respectively.

The first component circuit 20 at i-digit of the propagation stage m is supplied with the carry propagation signal bit Pi(m−1), the carry generation signal bit Gi(m−1), the control signal bit Ti(m−1) and the carry propagation signal bit Pi-$2^m$(m−1), the carry generation signal bit Gi-$2^m$(m−1) and the control signal bit Ti-$2^m$(m−1) at (i-$2^m$)-digit, and supplies the carry propagation signal bi t Pi(m), the carry generation signal bit Gi(m) and the control signal bit Ti(m) to the next propagation stage.

On the other hand, the second component circuit 21 at i-digit is supplied with the carry propagation signal bit Pi(m−1), the carry generation signal bit Gi(m−1) and the control signal bit Ti(m−1), and outputs the carry propagation signal bit Pi(m), the carry generation signal bit Gi(m) and the control signal bit Ti(m) as the second component circuit 21 has received.

Figure 5:
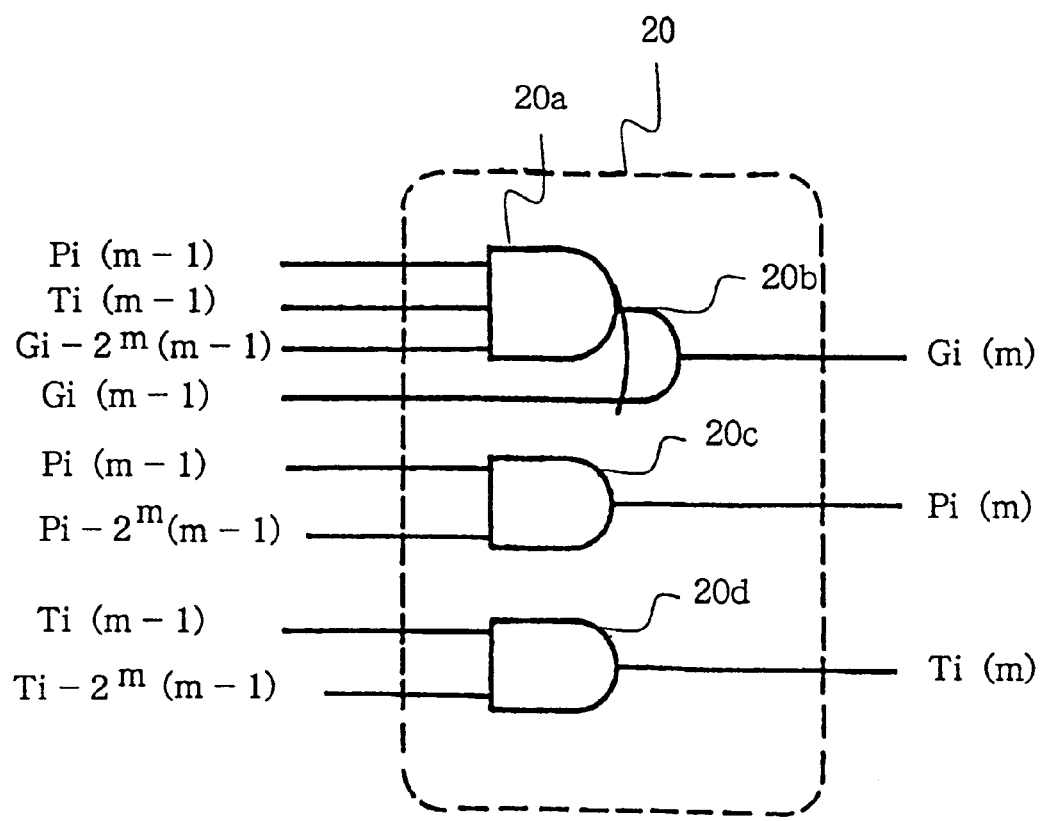
FIG. 5 is a logic diagram showing the arrangement of a first component circuit incorporated in the carry propagation block.
Figure 6:
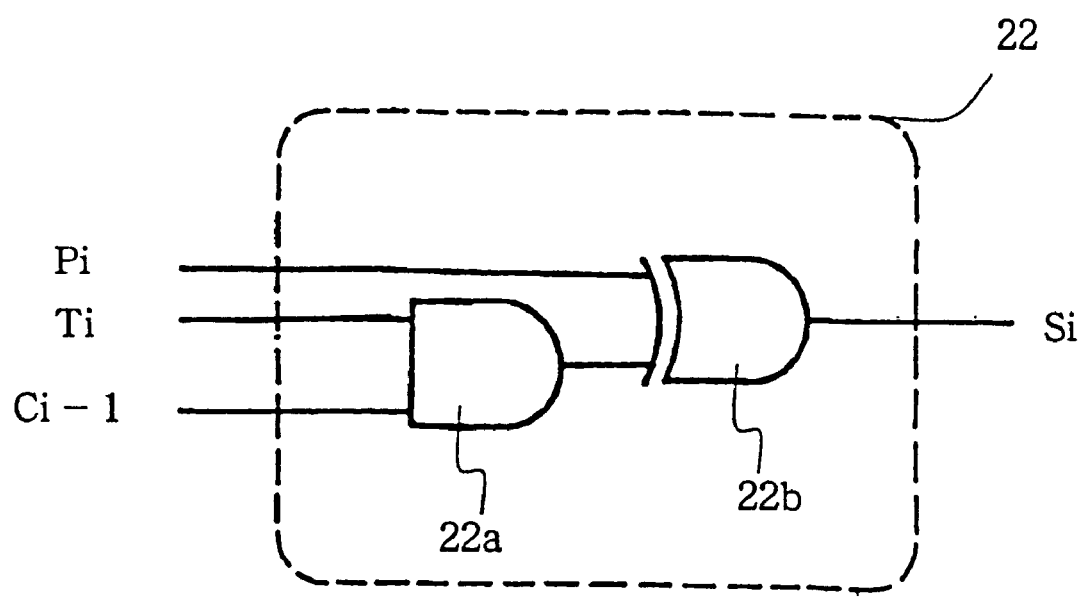
FIG. 6 is a logic diagram showing the arrangement of a third component circuit incorporated in the sum generation block.

FIG. 5 illustrates the arrangement of the first circuit 20 incorporated in the first, second and third propagation stages 10ba/10bb/10bc. A three-input AND gate 20a, a two-input OR gate 20b and two two-input AND gates form in combination the first component circuit 20. The logic gates may be implemented by CMOS transistors.

The carry propagation signal bit Pi(m−1) at i-digit, the control signal bit Ti(m−1) at i-digit, and the carry generation signal Gi−$2^m$(m−1) at (i−$2^m$)-digit are supplied to the three-input AND gate 20a, and the three-input AND gate 20a produces an output signal from these bits. The output signal of the three-input AND gate 20a is ORed with the carry generation signal bit Gi(m−1), and the OR gate 20b yields the carry generation signal Gi(m). The carry propagation signal bit Pi(m−1) at i-digit is ANDed with the carry propagation signal bit Pi−$2^m$(m−1) at (i−2)$^m$-digit, and the two-input AND gate 20c produces the carry propagation bit Pi(m). The control signal bit Ti(m−1) at i-digit is ANDed with the control signal bit Ti−$2^m$(m−1) at (i−2)$^m$-digit, and the two-input AND gate 20d yields the control signal bit Ti(m).

The second component circuit 21 incorporated in the first to third propagation stages 10ba/10bb/10bc is implemented by three buffer circuits, and the carry propagation signal bit pi(m−1), the carry generation signal bit Gi(m−1) and the control signal bit Ti(m−1) are supplied from the previous propagation stage (m−1) to the three buffer circuits, and the three buffer circuits transfer them to the next stage as the carry propagation signal bit Pi(m), the carry generation signal bit Gi(m) and the control signal bit Ti(m).

The first component circuit 20 of the final propagation stage 10bd is implemented by the three-input AND gate 20a and the two-input OR gate 20b, and outputs only the carry signal bit from the two-input OR gate 20b to the sum generation block 10c. Similarly, the second component circuit 21 of the final propagation stage 10bd is implemented by the buffer circuit assigned to the carry generation signal Gi(m−1), and outputs it to the sum generation block 10c as the carry signal bit Ci.

As will be understood from the foregoing description, using the hardware of the high-precision adder 10, the circuit components form a plurality of low-precision partial adders without increase the number of gate in the critical path.

Turning back to FIG. 4 of the drawings, a plurality of third component circuit 22 form the sum generation block, and the third component circuit 22 is represented by a small square in FIG. 4. In this instance, the sum generation block 10c has sixteen third component circuits.

A two-input AND gate 22a and a two-input exclusive-OR gate form in combination the third component circuit 22. The logic gates may be implemented by CMOS transistors.

The two-input AND gate 22a are supplied with the carry signal bit Ci−1 from the final propagation stage 10bd and the control signal bit Ti from the control signal port 10d, and carries out the AND operation for producing an output signal. The output signal is exclusive-ORed with the carry propagation signal bit Pi at i-digit, and the exclusive-OR gate 22b yields the sum signal bit Si.

The two-input AND gate 22a is enabled with the control signal bit Ti of logic "1" level, and transfers the carry bit Ci−1 to the exclusive-OR gate in the presence of the control signal bit Ti of logic "1" level. However, if the control signal bit Ti is in logic "0" level, the carry bit Ci−1 is blocked, and the exclusive-OR gate 22b only inverts the carry propagation signal bit Pi. As described hereinbefore, the carry signal generation block 10a produces the carry propagation bit Pi from the augend bit AGDi, the corresponding addend bit ADDi and the carry/non-carry bit from the lower digit (i−1). Therefore, the sum signal bit Si is simply produced from the augend bit AGDi, the addend bit ADDi and the carry/non-carry bit at the lower digit (i−1). Thus, the third component circuits 22 form a high-precision adder or a low-precision partial adder depending upon the logic level of the control signal bit Ti.

The carry-in signal is supplied to the third component circuit 22 assigned to the least significant bit S0, and is ANDed with the control signal bit T0. On the other hand, the carry signal C15 is supplied from the final propagation stage 10bd as the carry-out signal.

Figure 7:
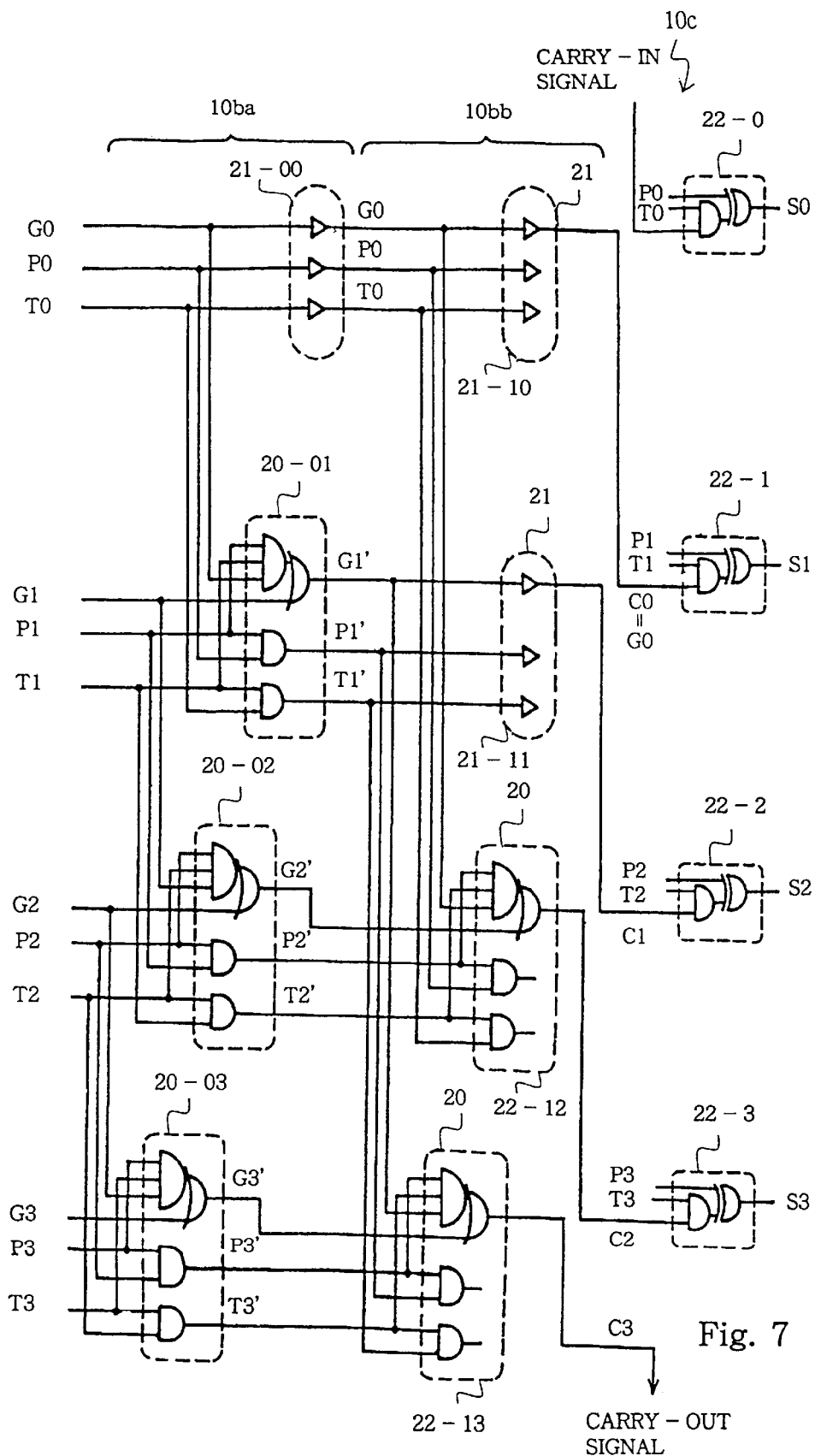
FIG. 7 is a logic diagram showing the circuit arrangement of the carry propagation block/the sum generation block.

FIG. 7 illustrates the carry propagation block 10b and the sum generation block 10c. The carry propagation block 10b and the sum generation block 10c are simplified on the assumption that the adder 10 calculates the sum from a 4-bit augend and a 4-bit addend. For this reason, the carry propagation block 10b has only two propagation stages 10ba and 10bb. However, the 16-bit adder is analogized from the 4-bit adder.

The first propagation stage 10ba includes the second component circuit 21-00 occupying zero-digit and the three first component circuits 20-01, 20-02 and 20-03 respectively assigned to 1-digit, 2-digit and 3-digit. The carry generation block (not shown in FIG. 7) and the control signal port 10d supply the carry generation signal bits G0, G1, G2, G3, the carry propagation signal bits P0, P1, P2, P3 and the control signal bits T0, T1, T2, T3 to the second component circuit 21-00 and the first component circuits 20-01, 20-02 and 20-03.

The first component circuit 21-00 transfers the carry generation signal bit G0, the signal propagation signal bit P0 and the control signal bit T0 to the second propagation stage 10bb, and the second component circuits 20-01, 20-02 and 20-03 produce a set of carry generation signal bit G1', carry propagation signal bit P1' and control signal bit T1', a set of carry generation signal bit G2', carry propagation signal bit P2' and control signal bit T2' and a set of carry generation signal bit G3', carry propagation signal bit P3' and control signal bit T3' from a set of carry generation signal bit G1, carry propagation signal bit P1 and control signal bit T1, a set of carry generation signal bit G2, carry propagation signal bit P2 and control signal bit T2 and a set of carry generation signal bit G3, carry propagation signal bit P3 and control signal bit T3, respectively. The sets of carry generation signal bits G1'/G2'/G3', carry propagation bits P1'/P2'/P3' and control signal bits T1'/T2'/T3' are supplied from the first propagation stage 10ba to the next propagation stage 10bb.

The second propagation stage 10bb includes two second component circuits 21-10 and 21-11 and two first component circuits 22-12 and 22-13. The second component circuits 21-10 and 21-11 transfer the carry generation signal bits G0 and G1' to the sum generation block 10c as carry signal bits C0 and C1. The first component circuits 22-12 and 22-13 produces carry bits C2 and C3 from the set of carry generation signal bit G2', carry propagation signal bit P2' and control signal bit T2' and the set of carry generation signal bit G3', carry propagation signal bit P3' and control signal bit T3', and the carry bits C2 and C3 are supplied to the sum generation block 10c.

The sum generation block 10c includes four third component circuits 22-0, 22-1, 22-2 and 22-3, and are assigned to 0-digit to 3-digit. The carry propagation signal bit P0, the control signal bit T0 and the carry-in signal are supplied from the carry signal generation block 10a, the control signal port 10d and the previous adder to the third component circuit 22-0 at 0-digit, and the third component circuit 22-0 produces the sum bit S0 therefrom. The carry propagation signal bit P1, the control signal bit T1 and the carry signal bit C0 are supplied from the carry signal generation block 10a, the control signal port 10d and the first component circuit 21-10 of the propagation stage 10bb to the third component circuit 21-1, and the third component circuit 21-1 produces the sum bit S1 therefrom. Similarly, the carry propagation signal bit P2, the control signal bit T2 and the carry signal bit C1 are supplied from the carry signal generation block 10a, the control signal port 10d and the first component circuit 21-11 of the propagation stage 10bb to the third component circuit 21-2, and the third component circuit 21-2 produces the sum bit S2 therefrom. The carry propagation signal bit P3, the control signal bit T3 and the carry signal bit C2 are supplied from the carry signal generation block 10a, the control signal port 10d and the second component circuit 221-120 of the propagation stage 10bb to the third component circuit 21-3, and the third component circuit 21-3 produces the sum bit S3 therefrom. The carry bit C3 is supplied to the next adder as a carry-out signal.

Even if the adder 10 according to the present invention is divided into a plurality of partial adders, the gates of the critical path in the adder 10 is expressed as $\log_2 n+3$, and is constant regardless of the number of the partial adders. Thus, the adder according to the present invention is free from the problems inherent in the prior art adder, i.e., delay time is varied depending upon the precision of the partial adders, and the binary carry-lookahead can not speed up the addition.

Figure 1:
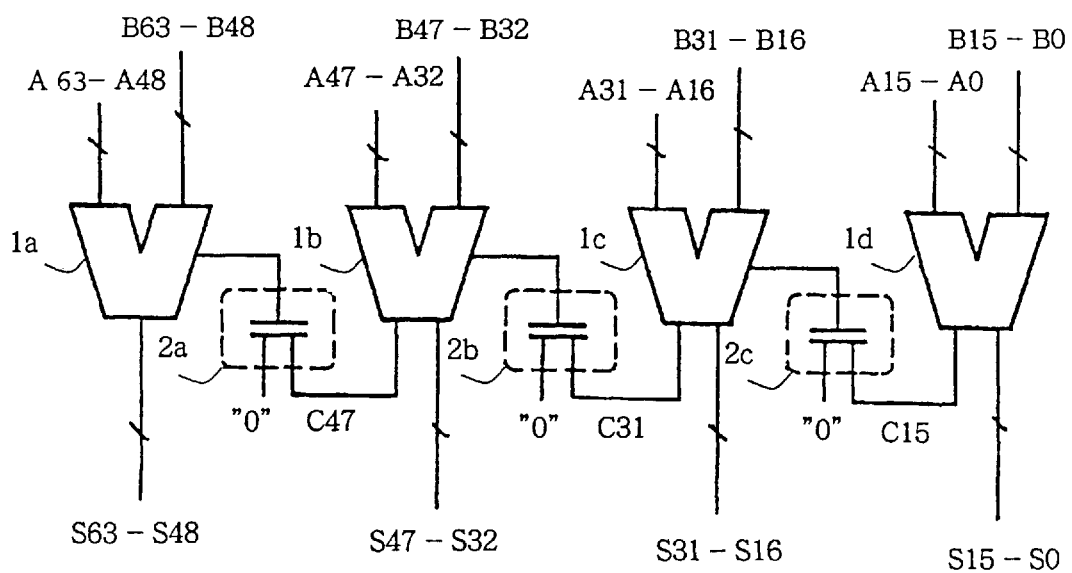
FIG. 1 is a circuit diagram showing the prior art composite adder implemented by the partial adders.
Figure 2:
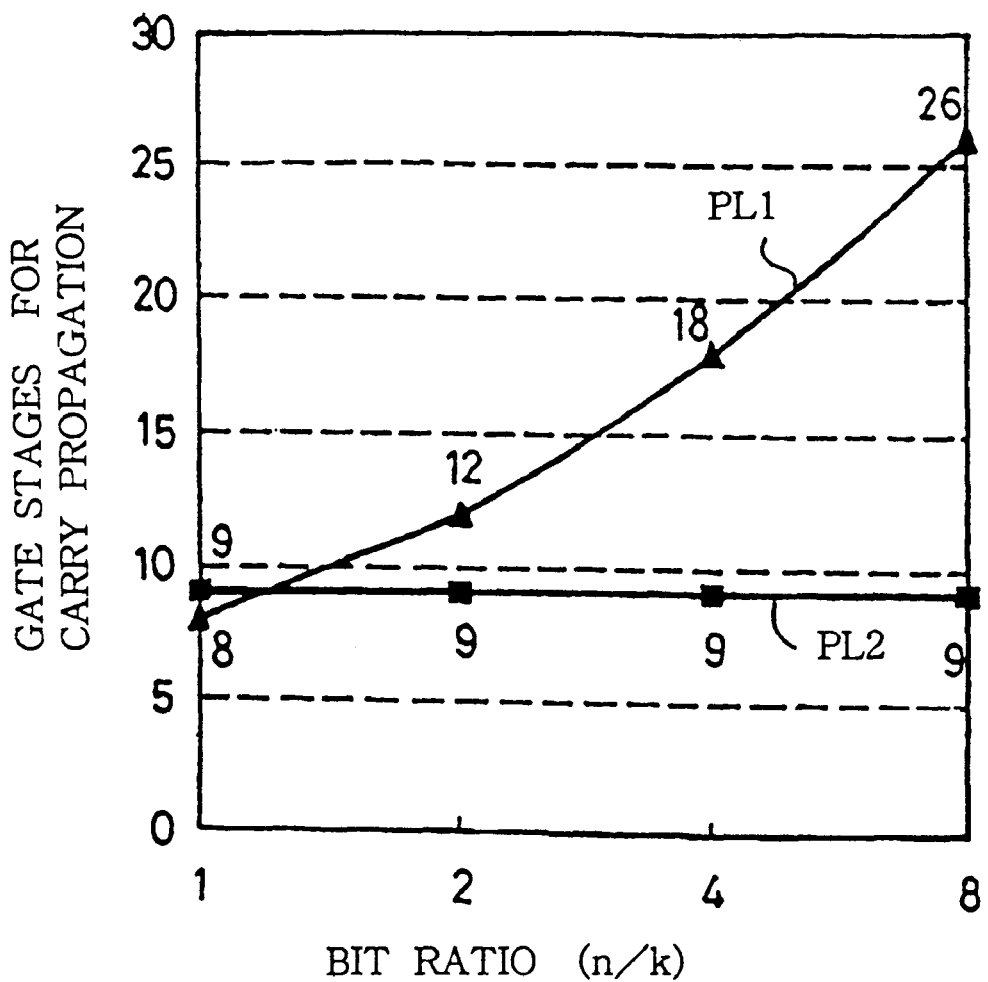
FIG. 2 is a graph showing the gate stages in terms of the bit ratio between the composite adder and the partial adder.

As described hereinbefore, the prior art adder increases the gate stages of the critical path as indicated by plots PL1. If the adder 10 is 64-bit type, the gate stages of the critical path is constant regardless of the number of partial adders as indicated by plots PL2 in FIG. 2. The gate stages of the carry propagation block 10b is calculated as $\log_2 64=6$ regardless of the number of partial adders, and the sum signal SUM is produced through only 9 stages. This results in a high-speed addition.

If the adder according to the present invention is incorporated in a general purpose microprocessor, the general purpose microprocessor achieves a high-precision addition without dividing the adder 10, and divides the adder 10 into a plurality of partial adders in an image processing, because 8–16 bit operation is required in the image processing.

Although a particular embodiment of the present invention has been shown and described, it will be obvious to those skilled in the art that various changes and modifications may be made without departing from the spirit and scope of the present invention.

For example, the adder 10 is described on the basis of the positive logic. An adder according to the present invention may be realized on the basis of the negative logic, and, accordingly, the logic gates of the embodiment are replaceable with other kinds of logic gates.

The logic gates may be implemented by using a pass transistor logic.

What is claimed is:

1. A method of adding an n-bit binary addend having an addend signal bit ADDi ($0 \leq i \leq n-1$) to an n-bit binary augend having a augend signal bit AGDi corresponding to said addend signal bit ADDi where n is equal to or grater than 2, comprising the steps of:

a) producing a carry generation signal having a carry generation signal bit Gi ($0 \leq i \leq n-1$) representative of a carry bit resulted from an addition between said addend signal bit ADDi and said augend signal bit AGDi and a carry propagation signal having a carry propagation signal bit Pi ($0 \leq i \leq n-1$) representative of a carry bit resulted from a addition between said addend signal bit ADDi, said augend signal bit AGDi and a carry bit supplied from an (i−1) digit;

b) producing a carry signal representative of carry bits from said carry propagation signal, said carry generation signal and an n-bit control signal having a control signal bit Ti ($0 \leq i \leq n-1$), said carry signal having a carry signal bit Ci ($0 \leq i \leq n-1$) produced through logical expression (1)

$$Ci=Gi(m)+Pi(m) \cdot Ti(m) \cdot Ci\text{-}2^m \qquad (1)$$

where Gi(m), Pi(m) and Ti(m) are a secondary carry generation signal bit, a secondary carry propagation bit and a secondary control signal bit at digit-i produced from said carry generation signal bit Gi, said carry propagation signal bit Pi and said control signal bit Ci and expressed as, $$Gi(m)=Gi(m-1)+Pi(m-1) \cdot Ti(m-1) \cdot Gi\text{-}2^m(m-1)$$

$$Pi(m)=Pi(m-1) \cdot Pi\text{-}2^m(m-1)$$

$$Ti(m)=Ti(m-1) \cdot Ti\text{-}2^m(m-1)$$

$$0 \leq m \leq \log_2 n-1,\ Gi(-1)=Gi,\ Pi(-1)=Pi,\ Ti(-1)=Ti,$$

logical expression (2) is satisfied by a combination of i and m which fulfill inequality of $i<2^m$ $$Gi\text{-}2^m(m-1)=Pi\text{-}2^m(m-1)=Ti\text{-}2^m(m-1)=0 \qquad (2);$$

and c) producing a sum signal representative of a sum of said n-bit binary augend signal and said n-bit binary addend signal, said sum signal having a sum signal bit Si ($0 \leq i \leq n-1$) produced through logical expression (3)

$$Si=Pi\widehat{\ } (Ti \cdot Ci\text{-}1) \qquad (3).$$

2. An adder for adding an n-bit binary addend signal having an addend signal bit ADDi to an n-bit binary augend signal having an augend signal bit AGDi corresponding to said addend signal bit ADDi, comprising:

a carry signal generation block for producing a carry generation signal having a carry generation signal bit Gi ($0 \leq i \leq n-1$) representative of a carry bit resulted from an addition between said addend signal bit ADDi and said augend signal bit AGDi and a carry propagation signal having a carry propagation signal bit Pi ($0 \leq i \leq n-1$) representative of a carry bit resulted from a addition between sad addend signal bit ADDi, said augend signal bit AGDi and a carry bit supplied from an (i−1) digit;

a carry propagation block for producing a carry signal representative of carry bits from said carry propagation signal, said carry generation signal and an n-bit control signal having a control signal bit Ti ($0 \leq i \leq n-1$), said carry signal having a carry signal bit Ci ($0 \leq i \leq n-1$) produced through logical expression (1)

$$Ci=Gi(m)+Pi(m) \cdot Ti(m) \cdot Ci\text{-}2^m \qquad (1)$$

where Gi(m), Pi(m) and Ti(m) are a secondary carry generation signal bit, a secondary carry propagation bit and a secondary control signal bit at digit-i produced from said carry generation signal bit Gi, said carry propagation signal bit Pi and said control signal bit Ci and expressed as, $$Gi(m)=Gi(m-1)+Pi(m-1)\cdot Ti(m-1)\cdot Gi\text{-}2^m(m-1) \quad (5)$$

$$Pi(m)=Pi(m-1)\cdot Pi\text{-}2^m(m-1)$$

$$Ti(m)=Ti(m-1)\cdot Ti\text{-}2^m(m-1)$$

$$0 \leq m \leq \log_2 n - 1, \; Gi(-1)=Gi, \; Pi(-1)=Pi, \; Ti(-1)=Ti,$$

logical expression (2) is satisfied by a combination of i and m which fulfill inequality of $i < 2^m$ $$Gi\text{-}2^m(m-1)=Pi\text{-}2^m(m-1)=Ti\text{-}2^m(m-1)=0 \quad (2);$$

and a sum generation block for producing a sum signal representative of a sum of said n-bit binary augend signal and said n-bit binary addend signal, said sum signal having a sum signal bit Si ($0 \leq i \leq n-1$) produced through logical expression (3)

$$Si=Pi\hat{\ }(Ti\cdot Ci\text{-}1) \quad (3).$$

3. The adder as set forth in claim 2, in which said carry propagation block includes m propagation stages where m satisfies inequality of $0 \leq m \leq \log_2 n - 1$, and said carry generation signal bit Gi, said carry propagation signal bit Pi and said control signal bit Ti are supplied to a first propagation stage of said m propagation stages, and are transferred from said first propagation stage to a final propagation stage of said m propagation stages as said secondary carry generation signal bit Gi(m), said secondary carry propagation signal bit Pi(m) and said secondary control signal bit Ti(m) for generating said carry signal bit Ci, the m of said first propagation stage and the m of said final propagation stage being zero and mx, respectively.

4. The adder as set forth in claim 3, in which said first propagation stage includes at least one first component circuit occupying the most significant digit (n−1) for producing said secondary carry generation signal bit Gn−1(0), said secondary carry propagation signal bit Pn−1(0) and said secondary control signal bit Tn−1(0) from said carry generation signal bit Gn−1, another carry generation signal bit G((n−1)−2⁰) said carry propagation signal bit Pi, another carry propagation signal bit P((n−1)−2⁰), said control signal bit Tn−1 and another control signal bit T((n−1)−2⁰), and at least one second component circuit occupying the least significant digit (0) for transferring said carry generation signal bit G0, said carry propagation signal bit P0 and said control signal bit T0 to the next propagation stage as said secondary carry generation signal bit G0(0), said secondary carry propagation signal bit P0(0) and said secondary control signal bit T0(0).

5. The adder as set forth in claim 3, in which said first propagation stage includes at least one first component circuit occupying the most significant digit (n−1) for producing said secondary carry generation signal bit Gn−1(0), said secondary carry propagation signal bit Pn−1(0) and said secondary control signal bit Tn−1(0) from said carry generation signal bit Gn−1, another carry generation signal bit G((n−1)−2⁰), said carry propagation signal bit Pi, another carry propagation signal bit P((n−1)−2⁰), said control signal bit Tn−1 and another control signal bit T((n−1)−2⁰), and at least one second component circuit occupying the least significant digit (0) for transferring said carry generation signal bit G0, said carry propagation signal bit P0 and said control signal bit T0 to the next propagation stage as said secondary carry generation signal bit G0(0), said secondary carry propagation signal bit P0(0) and said secondary control signal bit T0(0), said final propagation stage mx including a plurality of first component circuits each producing said carry bit Ci from said secondary carry generation signal bit Gi(mx−1), another secondary carry generation signal bit Gi−2$^{mx}$(mx−1), said secondary carry propagation signal bit Pi(mx−1), another secondary carry propagation signal bit Pi−2$^{mx}$(mx−1), said secondary control signal bit Ti(mx−1) and another control signal bit Ti−2$^{mx}$(mx−1), and a plurality of second component circuits each producing said carry bit Ci from said secondary carry generation signal bit Gi(mx−1).

6. The adder as set forth in claim 5, in which said carry propagation block further includes at least one intermediate propagation stage connected between said first propagation stage (0) and said final propagation stage (mx) and including a plurality of first component circuits each similar to said at least one first component circuit and a plurality of second component circuits each similar to said at least one second component circuit.

7. The adder as set forth in claim 6, in which each of said plurality of first component circuits occupying at m-stage includes a first AND gate for producing an output signal from said secondary carry propagation signal bit Pi(m−1), said secondary control signal bit Ti(m−1) and said another carry generation signal bit Gi−2$^m$(m−1), an OR gate for producing said secondary carry generation signal bit Gi(m) from said output signal of said first AND gate and said secondary carry generation signal bit Gi(m−1), a second AND gate for producing said secondary carry propagation signal bit Pi(m) from said secondary carry propagation signal bit Pi(m−1) and said another secondary carry propagation signal bit Pi−2$^m$(m−1), and a third AND gate for producing said secondary control signal bit Ti(m) from said secondary control signal bit Ti(m−1) and said another secondary control signal bit Ti−2$^m$(m−1).

8. The adder as set forth in claim 3, in which said final propagation stage mx includes a plurality of first component circuits each producing said carry bit Ci from said secondary carry generation signal bit Gi(mx−1), another secondary carry generation signal bit Gi−2$^{mx}$(mx−1), said secondary carry propagation signal bit Pi(mx−1), another secondary carry propagation signal bit Pi−2$^{mx}$(mx−1), said secondary control signal bit Ti(mx−1) and another control signal bit Ti−2$^{mx}$(mx−1), and a plurality of second component circuits each producing said carry bit Ci from said secondary carry generation signal bit Gi(mx−1), said sum generation block including a plurality of third component circuits for producing said sum signal bits, one of said plurality of third component circuits at zero-digit being supplied with a carry-in signal, said carry propagation signal bit P0 and said control signal bit T0 for producing said sum signal bit at the least significant digit, each of said plurality of third component circuits except for said one of said plurality of third component circuits being supplied with said carry bit Ci-1, said carry propagation signal bit Pi and said control signal bit Ti for producing said sum signal bit Si.

9. The adder as set forth in claim 8, in which each of said plurality of third component circuits includes an AND gate for producing an output signal from said control signal bit Ti and one of said carry bit Ci-1 and said carry-in signal, and an exclusive-OR gate for producing sum signal bit Si from said output signal of said AND gate and said carry propagation signal bit Pi.

* * * * *